United States Patent [19]

Taylor

[11] 4,420,169

[45] Dec. 13, 1983

[54] TRAILER HITCH

[76] Inventor: Wayne A. Taylor, P.O. Box 231, Fairfield, Mont. 59436

[21] Appl. No.: 373,419

[22] Filed: Apr. 30, 1982

[51] Int. Cl.³ .............................................. B60D 1/14
[52] U.S. Cl. ............................... 280/446 R; 280/474; 280/494
[58] Field of Search ........... 280/474, 493, 494, 446 R, 280/446 B, 478 R, 450

[56] References Cited

U.S. PATENT DOCUMENTS

| | | | |
|---|---|---|---|
| 1,518,444 | 4/1921 | Paul | 280/446 A |
| 1,853,701 | 3/1927 | Schlaegel | 280/438 R |
| 2,743,118 | 7/1953 | Dotson | 280/478 R |
| 2,879,079 | 3/1959 | Edwards | 280/446 R |
| 3,008,734 | 11/1961 | Harms | 280/478 R |
| 3,556,558 | 7/1968 | McKee | 280/406 A |
| 3,891,238 | 6/1975 | Ehlert | 280/446 R |
| 3,964,767 | 6/1976 | Williams | 280/446 B |

OTHER PUBLICATIONS

Advertisement: "Miracle Hitch" by The Pullright Trailer Towing System 1612 W. Indiana Ave., Elkhart, IN 46514.

Primary Examiner—John A. Pekar
Assistant Examiner—D. Lynn Fugate
Attorney, Agent, or Firm—Wells St. John & Roberts

[57] ABSTRACT

A trailer hitch attachment mounting between a towing vehicle and a trailer for simulating a "5th" wheel trailer hookup. The hitch mounts to the towing vehicle undercarriage rearwardly adjacent the rear axle and includes a drawbar that extends to the towing tongue of the trailer. The drawbar is pivoted at a front end about a primary axis directly behind the rear axle and at a rearward end, about a secondary axis at the connection to the trailer towing tongue. A lockout mechanism is provided for alternately locking the drawbar against pivotal motion about one or the other the pivot axes, so only pivotal motion will be allowed about only one axis at any given time. The pivot axes are alternated according to relative angular movement of the towing vehicle relative to the trailer.

15 Claims, 6 Drawing Figures

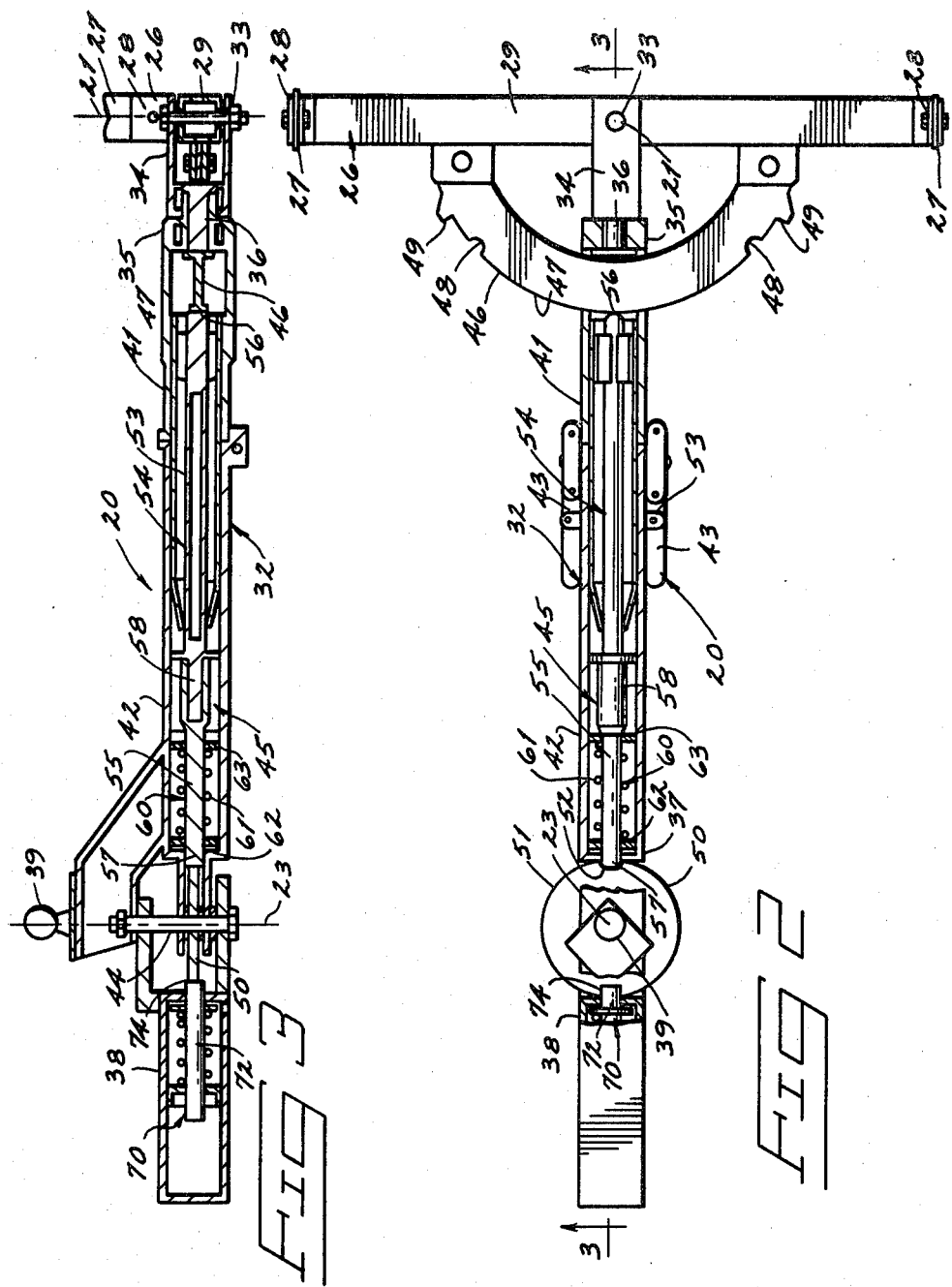

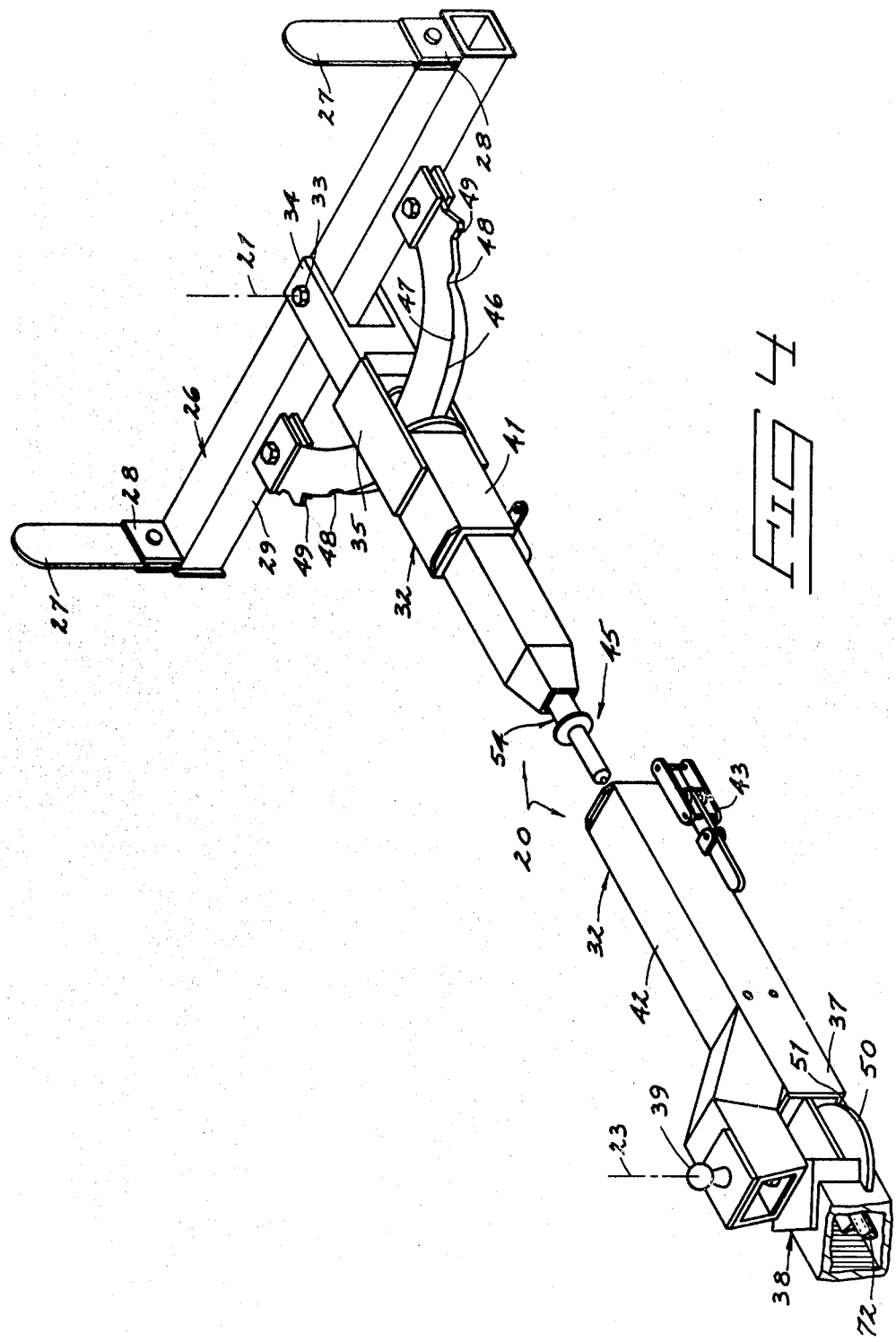

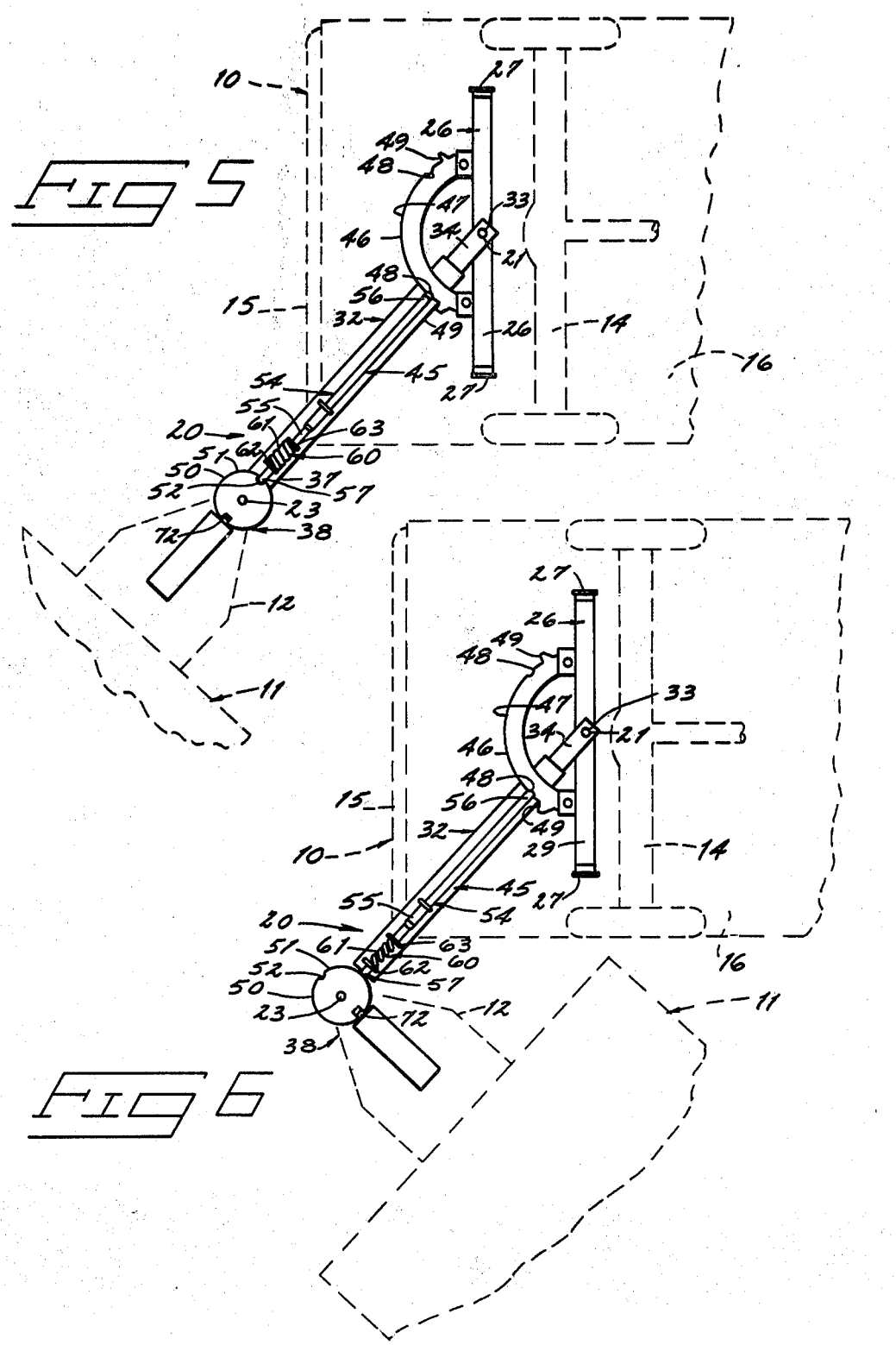

TRAILER HITCH

TECHNICAL FIELD

The present invention relates to towing hitches providing changeable pivot axes between the towing vehicle and trailer.

BACKGROUND OF THE INVENTION

A substantial part of a towed vehicle's weight is transmitted directly to the towing vehicle through the interconnecting hitch point. The hitch point is usually located at the rearward end of the towing vehicle, substantially rearward of the rear wheels. If the "tongue weight" of the towed vehicle is substantial, considerable control of the towing vehicle is lost and handling characteristics are adversely effected.

In response to the above problem and other inconveniences caused by standard hitch arrangements, "fifth wheel" connections have been developed. The typical fifth wheel arrangement involves the use of a specially constructed trailer having an overhang at the front end that will at least partially overlap the bed of a towing truck. The "fifth wheel" is a hitch connection attached to the truck bed just over the rear axle. Obviously, standard "blunt nose" trailers cannot make use of the "fifth wheel" since the trailer design will not allow such mounting. Furthermore, "fifth wheel" arrangements have, to this date, been typically used with pickups and trucks since there is no appropriate area for mounting over the rear differential of an automobile.

An advantage of a "fifth wheel" trailer connection is better handling characteristics due to the more direct transfer of "tongue weight" onto the rear axle of the towing vehicle. It remains desirable, however, to incorporate the fifth wheel advantages to standard trailers and forms of towing vehicles other than trucks and pickups.

U.S. Pat. No. 3,556,558 to McKee discloses a hitch arrangement by which the ordinary ball hitch of a trailer is connected to a drawbar. The drawbar, in turn, is pivotally connected to the vehicle frame adjacent the rear axle. An initial pivot is established directly behind the rear axle of the towing vehicle. This pivot point is maintained until the drawbar comes into abutment with the frame sides or some other abutment surface. At this time, "stabilizer bars" on the drawbar snap from engagement within a slot provided on a bracket fixed to the trailer tongue frame. The rods slide over the bracket to allow pivotal motion of the trailer and drawbar about the usual pivot axis at the ball hitch. Pivotal motion is also allowed at this time about the axis at the forward drawbar end, until the spring bars snap back into engagement with the notched bracket.

The vehicle operator must therefore contend with two simultaneously functional pivot points between the towing vehicle and trailer when maneuvering at sharp angles. The primary pivot at the forward end of the drawbar is limited in its pivotal motion only by abutment surfaces at the ends of a wide arc. The drawbar will pivot continuously within this arc depending only upon the angular orientation of the trailer to the towing vehicle. Also, once the "stabilizer bars" snap from engagement with the slotted bracket, both pivots become operable throughout the angular range dictated only by stops at the ends of prescribed angular motion.

Another attempted solution to this problem is exhibited by the "Miracle Hitch" product from "The Pullright Trailer Towing System" at 1612 W. Indiana Ave., Elkhart, Ind. 46514. The "Miracle Hitch" trailer hitch provides the advantages of a "fifth wheel" without regard to the type of towing vehicle. Like the McKee device, the "Miracle Hitch" mounts to the vehicle undercarriage to provide a primary hitch pivot near the towing vehicle rear axle. Unlike the McKee hitch, however, the "Miracle Hitch" is rigidly affixed to the tongue of the trailer vehicle and permits pivotal motion only at the forward end of the drawbar. This device therefore eliminates the possibility of simultaneous pivotal motion about two longitudinally separated axes and therefore demonstrates consistent maneuvering traits.

The problem remains, however, of providing maximum maneuverability afforded by a rearward hitch, while retaining control and favorable handling characteristics afforded by a "5th wheel" type hitch while the trailer is in transit. No previous hitch arrangement provides these combined abilities with a reasonable degree of safety and reliability.

BRIEF DESCRIPTION OF THE DRAWINGS

A preferred form of the present invention is illustrated in the accompanying drawings in which:

FIG. 2 is a top plan view of the present hitch assembly with portions thereof broken away;

FIG. 3 is a cross-sectional view taken substantially along line 3—3 in FIG. 2;

FIG. 4 is an exploded pictorial view of the present hitch assembly;

FIG. 5 is a diagrammatic view of the hitch assembly in one operative angular orientation; and FIG. 6 is a diagrammatic view similar to FIG. 5 only illustrating another operative relationship of the component parts of the present hitch.

DETAILED DESCRIPTION OF A PREFERRED EMBODIMENT

Figure 1:
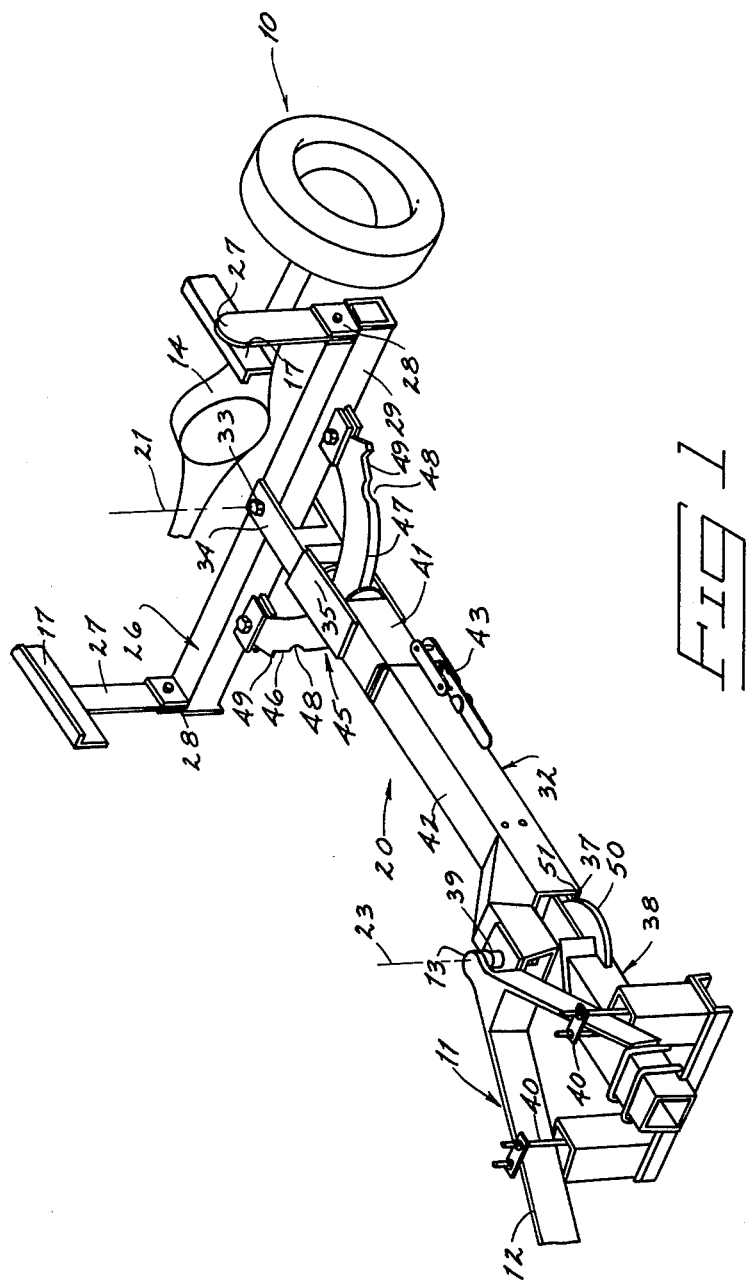
FIG. 1 is a pictorial view of the present hitch arrangement with portions of a towing vehicle and trailer diagrammatically illustrated.

The following disclosure is submitted in compliance with the constitutional purpose of the patent laws, "to promote the progress of science and the useful arts" (Article 1, Section 8).

The present hitch is provided to pivotally interconnect a towing vehicle 10 and a trailer 11 as diagrammatically illustrated in FIGS. 4, 5 and 6. For purposes of later description, it should be understood that the trailer 11 will include a tongue frame 12, a typical portion of which is illustrated in FIG. 1. The tongue frame may include a ball socket member 13 for mounting a conventional ball hitch (not shown) that is replaced by the present hitch assembly. Again, for purposes of later description, the towing vehicle 10 is shown to include a rear axle 14 situated somewhat forwardly of a vehicle rear end 15. The vehicle will include an undercarriage 16 supported by a rigid vehicle frame 17.

The present hitch is indicated generally in the drawings by the reference character 20. The present hitch 20 is provided generally for attaching the trailer 11 to a towing vehicle 10 and to selectively allow relative pivotal motion about one or the other of two independent axes, a primary pivot axis 21 adjacent the rear axle 14, or a secondary pivot axis 23 adjacent the vehicle rear end 15.

The present hitch 20 includes a hanger frame 26 that is mountable to the vehicle frame 17. It is preferred that the hanger frame 26 be mounted to the vehicle along the undercarriage 16 rearwardly adjacent the rear axle 14. The hanger frame 26 may be suspended by ears 27 welded or otherwise affixed to the vehicle frame and pivot brackets 28 at opposed ends of an elongated transverse bar 29. The bar will extend transversely across the vehicle undercarriage closely adjacent the rear axle 14 and will pivot freely about a transverse horizontal axis defined by the pivot brackets 28.

A drawbar means is generally indicated at 32 extending between the pivot axes 21 and 23. A front end 35 of the drawbar means includes a pivot bracket 34. The bracket 34 is mounted to the hanger frame 26. A pin 33 extends through the pivot bracket 34 and bar 29 to define the primary pivot axis 21. The pin is centered along the length of transverse bar 29 to locate the primary pivot axis between the vehicle wheels.

It is noted that pin 33 and bracket 34 are mounted to the hanger frame to permit pivotal motion only about the primary pivot axis 21. Pivotal motion about a horizontal longitudinal axis is provided at a pivot 36 (FIGS. 2, 3) between the bracket 34 and the front drawbar end 35. Pivot 36 allows independent "rolling" or side-to-side tipping between the towing and towed vehicles.

The drawbar means 32 extends from the front drawbar end 35 to a rear end 37. The rearward drawbar end 37 is pivotally mounted to a bracket means 38.

The bracket means 38 mounts the drawbar means to the trailer tongue frame 12 for free pivotal movement thereon about the secondary pivot axis 23. Bracket means 38 also includes a ball hitch member 39 that is adapted to receive the ball socket member 13 of the trailer vehicle. It may also include a hold down means 40 (FIG. 1) in the form of clamps for releasably securing the bracket to the trailer tongue 12 as shown by FIG. 1. The hold down means 40 functions to secure the bracket means 38 to the trailer so motion of the trailer will cause direct corresponding motion of the bracket means 38.

The drawbar means 32 is preferably provided in two separable sections; a forward section 41, and a rearward, removable section 42. A latch means 43 is provided on the separable sections 41, 42, and is operable to selectively clamp the sections together in longitudinal alignment. When separated, the forward section will remain with the hanger frame on the towing vehicle and the rearward section will remain as an extension of the trailer tongue frame.

An important provision of the present invention is a lockout means 45 that interconnects the hanger frame 26, drawbar means 32, and bracket means 38. The lockout means 45 functions in response to relative angular positioning of the towing vehicle and trailer for alternately and positively locking the drawbar against pivotal motion about one or the other of the axes 21 or 23. It is emphasized that the lockout means functions alternately to positively lock the drawbar means against pivotal motion about one or the other of the two pivot axes. Therefore, only one of the axes is functional at any given time. There is no condition during normal towing operation under which the drawbar means will pivot simultaneously on both primary and secondary pivot axes 21, 23.

Lockout means 45 may include a first cam 46 mounted to the hanger frame 26. Cam 46 includes a first curved surface 47 that is generated on an arc centered on the primary pivot axis 21. The curved cam surface is broken at prescribed angular locations by stops or notches 48 and outwardly adjacent abutments 49. The notches 48 may be between 80° to 90° apart and spaced equiangularly from the longitudinal center line or mid plane of the vehicle.

Lockout means 45 may also include a second cam 50 mounted to the bracket means 38. Second cam 50 includes a second curved cam surface 51 that is generated about the secondary pivot axis 23. A stop or notch 52 is located along the second cam surface, preferably centered on the trailer tongue. The second cam 50 is releasably secured against motion relative to the bracket and trailer tongue by a bolt means 70 that will be described in detail further on in this description.

A lock pin 54 may be provided as part of the lockout means 45. The lock pin 54 may be slidably mounted to the drawbar means 32. Preferably, the lock pin is mounted within the confines of the drawbar to slide longitudinally in response to actuation by a control means 60. The pin 54 includes a forward end 56 that slidably engages the curved surface of the first cam 46. The end 56 is shaped to be received within either of the notches 48. A rearward end 57 of the pin will slidably engage the second curved surface 51 and is shaped to be received within the notch 52 thereon.

The control means 60 briefly mentioned above may simply be comprised of a compression spring 61 mounted between a shoulder 62 on pin 54 and a collar 63 on drawbar 32. The compression spring will therefore constantly urge the rearward end of the lock pin against the second cam surface 51 and into notch 52.

Lock pin 54, the drawbar 32, may be provided in two interconnectable sections. The forward section 41 of the drawbar and a forward lock pin section 53 will therefore remain with the hanger frame on the towing vehicle. The remaining rearward drawbar section 42 and a rearward lock pin section 55 may be mounted to the trailer tongue frame along with the bracket means 38. Latch means 43 may be selectively operated to secure or release the sections. When secured, the drawbar sections become rigid longitudinally. The lock pin sections 53, 55 interfit at a socket joint 58 to define an overall lock pin length equal to the distance between the cam surfaces plus the depth of one of the notches 48 or 52. This length dimension requires that one of the notches 48 or 52 be engaged by the lock pin at all times.

The bolt means 70 briefly referred to above is provided between bracket means 38 and secondary cam 50 to facilitate connection of the drawbar sections when one section 41 is mounted to a vehicle and the other section 42 is mounted to a trailer 11. The bolt means 70 can be manually operated to free the rearward drawbar section 42 for pivotal movement relative to the bracket means 38 (and trailer tongue 12). This allows the rear drawbar section 42 to be manually aligned with the forward drawbar section 41 as the towing vehicle is backed into position for connection to the trailer.

The bolt means 70 may simply be comprised of a spring loaded bolt 72 (FIGS. 2 and 3) mounted to bracket means 38 and normally urged against the cam 50. The bolt 72 is normally received in a notch 74 formed in the cam 50 in order to lock the cam 50 against pivotal motion about the secondary axis 23. The bolt 72 can be pried loose of the notch 74 (by use, say, of a screwdriver) to free the cam 50 for pivotal motion about the secondary axis 23. An operator can therefore swing the rearward drawbar section 42 about the secondary pivot axis 23 in order to align it for connection with the forward hitch section 41 mounted to the towing vehicle.

When the cam 50 and drawbar section 42 pivot back into proper position, the bolt 72 will snap back into the notch 74 and again lock the cam 50 against any motion on the bracket means 38. This may be done automatically after interconnection of the drawbar sections 41, 42 simply by driving the towing vehicle forwardly. As the trailer follows and attains an aligned position behind the towing vehicle, the drawbar 32 will automatically swing into proper alignment with the trailer tongue 12 and the bolt 72 will snap into the notch 74. The cam 50 will then remain locked to the bracket 38 and trailer tongue 12 until the bolt is again released. For normal towing and maneuvering between the towing and towed vehicles, then, the cam 50 will remain locked in position relative to the bracket means 38 and trailer tongue 12.

The present hitch assembly mounts easily to relatively any vehicle in which there is frame and undercarriage extending rearwardly of the rear axle with clearance to suspend the hanger frame 26. The ears 27 may be secured to the frame by welding or other fastening means. Care is taken to mount the hanger frame substantially parallel to the rear axle and closely adjacent thereto. A distance of approximately six inches from the rear axle differential housing has been used with success. This distance allows swinging motion of the hanger frame 26 about the transverse horizontal axis of the pivot pins 28.

The bracket means 38 may be temporarily or permanently affixed to the trailer tongue frame 12. This may be done by securing the ball hitch member 39 with the ball socket member 13 of the trailer tongue 12. The hold down means 40 can then be secured to the tongue frame 12 to rigidly attach the bracket means to the trailer. Note that the pin, ball, and socket 44, 39, and 13 are in vertical alignment. Furthermore, the pin 44 is elongated, interconnecting the bracket means 38, secondary cam 50 and rearward drawbar section 42. This effectively prevents pivotal motion of the bracket 38 relative to the drawbar other than at the secondary pivot axis 23 as defined by pin 44.

The hitch components, having been properly attached to the appropriate towing and trailer vehicles, may be interconnected to complete the hitch unit. This is done by maneuvering the towing vehicle into position so the rearwardly projecting lock pin section will be received within the open forward end of the rearward drawbar section 42.

The interconnection will be facilitated by operation of the bolt means 70 to release the secondary cam 50 and rearward drawbar section 42 to pivot relatively freely about the secondary pivot axis. This can be done by prying the bolt 72 free of the cam notch 74. The rearward drawbar section 42 is then free to pivot in the direction of the approaching towing vehicle and alignment with the forward drawbar section 41. When rough alignment is achieved, the interfitting lock pin sections 54, 55 will guide the two drawbar sections 41, 42 into longitudinal alignment. Continued rearward movement of the towing vehicle will then bring the two sections into flush engagement. The latch means 43 can then be used to secure the sections together, forming a longitudinally rigid drawbar. The trailer 11 is then attached by the present hitch to the vehicle pin.

As the towing vehicle pulls forwardly, the trailer and drawbar components will move automatically into an aligned towing orientation. As this happens, the bolt 72 will snap back into the cam notch 74, thereby locking the cam 50 against pivotal motion relative to the bracket means 38. The cam 50 will henceforth pivot with the bracket means 38 and trailer tongue 12 until it is manually unlocked again.

At all times the hitch functions as a "fifth wheel" hookup, where the trailer tongue weight is applied very near the rear axle. The tongue weight is therefore transferred nearly directly to the rear vehicle wheels without adversely affecting the overall vechicle weight distribution. Handling and ride characteristics of the towing vehicle will not be overly affected by the trailer weight. During normal driving along straight roadways and turns less than 45°, the trailer will be pulled from the primary pivot axis 21. The secondary pivot 23 will remain locked and inoperative during this time since the lock pin end 57 remains firmly seated in the cam notch 52 while the forward link pin end 56 slides over the first cam surface 47. Thus, only pivotal motion about primary axis 21 is allowed. The pin cannot "unlock" the bracket from the drawbar since the cam surface 47 will not allow the pin to slide forwardly. Relative tilting or swaying motion between the towing vehicle and trailer is facilitated through the horizontal longitudinal pivot 36.

When the towing vehicle turns sharply, say around a switchback or sharp street corner, the drawbar will be pivoted toward one or the other of the stop notches 48. The forward bar end 35 will also come into contact with the adjacent abutment 49 on cam 46. The engaged abutment 49 will prevent further pivotal movement of the drawbar in the initial direction of movement. The lock pin also comes into alignment with the adjacent notch 48. "Unlocking" of the bracket 38 for pivotal movement relative to the drawbar now becomes a possibility. The pin, however, will remain disengaged from the notch 48 until turning forces of the now stationary drawbar against the bracket cause the second cam 50 to pivot. As this happens, the pin end 57 is cammed out of notch 52 and the opposite pin end 56 slips simultaneously into the adjacent notch 48, locking the drawbar against pivotal motion against the primary axis. The bracket means 38 and trailer tongue 12 are thus released to pivot together about the secondary axis 23 at the same instant the drawbar is locked at the primary pivot axis 21. The trailer pivot axis is therefore shifted positively and nearly instantly from the primary to the secondary axis. Note that there is no transition period during which the drawbar 32 may pivot about both axes 21 and 23. The shift from one pivot axis to the other is a positive action. When one pivot is freed, the other is simultaneously locked. This feature is emphasized since control from the towing vehicle would be severely impaired should both axes become free at the same time.

FIGS. 5 and 6 illustrate the limits of pivotal motion for the drawbar and bracket. A towing vehicle and a trailer are also shown in dashed lines to indicate their resulting positions. In FIG. 5, the vehicle and trailer have pivoted relative to one another about the primary axis to the limit defined by the abutment 49. It is noted, however, that the pin has not yet engaged the adjacent notch 48 since further turning forces have not forced the bracket to cam the pin from the notch 52 and into the notch of the first cam 46.

FIG. 6 illustrates the relative angular positioning possible once the pivot point has been shifted from the primary axis 21 to the secondary axis 23 as the lock pin is shifted to disengage notch 52 and simultaneously engage notch 48. The secondary pivot axis 23 allows the trailer and vehicle to be maneuvered around very sharp corners. It is emphasized that only pivotal motion about the second axis 23 is allowed during this time, since the drawbar is locked by pin 54 against motion about the primary axis.

As the towing vehicle moves toward a straight path, the bracket means and attached trailer tongue will pivot relative to the fixed drawbar about the secondary axis. The lock pin 54 will slide over the cam surface 50 until the second cam notch 52 comes into alignment with the pin end 57. When this happens, the compression spring 61 will snap the rearward pin end 57 immediately into the notch 52. This action instantly locks the drawbar against further pivotal motion about the secondary pivot axis 23 and releases the drawbar to pivot again about the primary pivot axis 21. The trailer tongue and drawbar are therefore made rigid.

The pins defining axes 21 and 23 are long and well secured along their lengths between the respective engaged hitch members 41, 42. The vertical arrangement of the pins 21, 23 and the engaged bearing surfaces of the bracket 38, drawbar 32, and hanger frame 26 provide a strong attachment at the trailer tongue 12. No movement is allowed except in a horizontal plane. The trailer tongue weight is carried by the bracket and is transferred forward to the primary axis and hanger frame 26 regardless of the angular orientation of the bracket 38 and drawbar 32. No twisting of the hitch can occur except as provided specifically through the horizontal longitudinal pivot 36.

It is noted in FIG. 6 that the bracket 38 is approximately 90° or perpendicular to the drawbar. In this position, the trailer tongue weight causes a torque to be applied between the bracket means and drawbar, causing a tendency to buckle at the point of connection between the bracket means 38 and rearward drawbar end 37. The interconnecting pivot pin 44 is therefore constructed of heavy material and the portions of the drawbar and bracket means engaged by pin 44 are also reinforced. The bracket means is therefore held securely so no twisting or buckling will be allowed. Furthermore, the tongue weight of the trailer will be concentrated at the hanger frame regardless of the angular position of the bracket and drawbar, or which of the pivot axes is operative.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. A trailer hitch for attaching a trailer vehicle to a towing vehicle having a rear axle, the hitch comprising:
    a hanger frame adapted to be mounted to the towing vehicle adjacent the rear axle thereof;
    drawbar means mounted at a forward end to the hanger frame for pivotal movement thereon about a primary axis, and extending to a rear end;
    bracket means on the drawbar means at the rear end thereof for free pivotal movement thereon about a secondary axis, mountable to the trailer vehicle;
    lockout means interconnecting the hanger frame, drawbar means, and bracket means, for alternately (a) positively locking the drawbar against pivotal motion about one axis while (b) simultaneously allowing pivotal motion about the other axis;
    wherein said lockout means includes:
    a first cam mounted to the hanger frame having a curved cam surface centered on the primary axis and stops positioned thereon at selected angular positions with respect to the primary axis;
    a second cam mounted to the bracket means having a second curved cam surface centered on the secondary axis and a stop positioned thereon at a prescribed angular position with respect to the secondary axis;
    lock pin means slidably mounted to the drawbar and having a forward end for slidably engaging the curved cam surface of the first cam and a rearward end for slidably engaging the curved cam surface of the second cam; and
    control means for normally urging the lock pin toward the second cam surface and the stop thereon;
    wherein the stop on the second cam and the rearward pin end releasably interlock at a prescribed angular relationship of the bracket means and drawbar means.

2. The trailer hitch as claimed by claim 1 wherein the stop on the second cam is positioned to interlock with the rearward end of the lock pin when the bracket and associated trailer tongue frame are in alignment with the drawbar.

3. The trailer hitch as claimed by claim 1 wherein the stops on the first cam are spaced to opposite sides of the primary pivot axis to permit at least 80° to 90° movement of the drawbar about the primary axis between the first cam stops.

4. The trailer hitch as claimed by claim 1 wherein the trailer vehicle includes a tongue frame and the drawbar means is provided in two separable sections;
    wherein one of the separable drawbar sections is mounted to the hanger frame for pivotal motion about the primary axis, and the remaining separable drawbar section is mountable to the trailer tongue frame; and
    latch means for releasably interlocking the drawbar sections.

5. The trailer hitch as claimed by claim 1 further comprising: a pivot bracket mounting the drawbar means to the hanger frame for motion about the primary axis and about a horizontal longitudinal axis.

6. The trailer hitch as claimed by claim 5 wherein the trailer vehicle includes a tongue frame and the drawbar means is provided in two separable sections;
    wherein one of the separable drawbar sections is mounted to the hanger frame for pivotal motion about the primary axis, and the remaining separable drawbar section is mountable to the trailer tongue frame; and
    latch means for releasably interlocking the drawbar sections.

7. The trailer hitch as claimed by claim 1 for trailer vehicles having towing tongues with ball socket hitch members at forward ends thereof; said hitch further comprising:

a ball hitch member on the bracket means mounted coaxially with the secondary axis, and adapted to mount the ball socket member of the trailer vehicle.

8. The trailer hitch as claimed by claim 1 wherein the lockout means includes:
hold down means on the bracket means adapted to mount the second cam to the trailer vehicle.

9. The trailer hitch of claim 1 further comprising:
bolt means on the bracket means for selectively locking the second cam relative to bracket and for selectively releasing the cam to pivot with the drawbar and lock pin about the secondary axis.

10. An articulated trailer hitch for attaching a trailer vehicle having a tongue frame end, to a towing vehicle having a rear axle located forward of a rearward vehicle end along an undercarriage thereof, said hitch comprising:
a hanger frame adapted to be pivotally mounted to the vehicle undercarriage about a transverse axis rearwardly adjacent the rear axle;
an elongated drawbar means mounted at a forward tongue end to the hanger frame for pivotal movement about a primary pivot axis perpendicular to the transverse axis and for free rotational movement about a longitudinal axis;
bracket means mounted to a rearward end of the tongue member for pivotal motion thereon about a secondary pivot axis parallel to the first axis and spaced rearwardly therefrom, and adapted to be mounted to the tongue frame of the towing vehicle;
positive lockout means operatively connecting the bracket, tongue member and hanger frame and alternately positionable between (a) a first position positively locking the bracket to the drawbar against pivotal motion about the secondary pivot axis while simultaneously allowing free pivotal motion of the drawbar relative to the hanger frame about the primary pivot axis; and (b) a second position positively locking the hanger frame and the drawbar against relative pivotal motion about the primary pivot axis while simultaneously allowing free pivotal motion of the bracket relative to the drawbar about the secondary pivot axis; and
control means on the bracket and hanger frame for actuating the lockout means to assume its first position immediately as the bracket and drawbar pivot relative to one another about the secondary axis to a prescribed angular relationship, and to assume its second position immediately as the drawbar pivots about the primary axis relative to the hanger frame to a selected angular relationship.

11. The trailer hitch as claimed by claim 10 for trailer vehicles having towing tongues with ball socket hitch members at forward ends thereof; said hitch further comprising:
a ball hitch member on the bracket means mounted coaxially with the secondary pivot, and adapted to mount the ball socket member of the trailer vehicle.

12. The trailer hitch as claimed by claim 11 wherein the lockout means includes:
a cam mounted to the bracket means having a cam surface centered on the secondary axis and having a stop thereon;
a lock pin on the drawbar operatively connected with the cam for selectively engaging the cam to lock the cam and drawbar against relative pivotal motion;
hold down means on the bracket means adapted to mount the cam to the towing tongue of the trailer vehicle.

13. The trailer hitch of claim 10 wherein the bracket means includes:
a cam mounted to the bracket means for pivotal movement thereon about the secondary axis, with a cam surface centered on the secondary axis and having a stop formed thereon;
a lock pin on the drawbar operatively connected with the cam surface for selectively engaging the stop to lock the drawbar to the cam against relative pivotal motion;
bolt means on the bracket means for selectively locking the cam relative to bracket means and for selectively releasing the cam to pivot with the drawbar and lock pin about the secondary axis.

14. The trailer hitch as claimed by claim 10 wherein the trailer vehicle includes a tongue frame and the drawbar means is provided in two separable sections;
one section being mounted to the hanger frame for pivotal motion about the primary axis, and the remaining section adapted to be mounted to the trailer towing tongue frame; and
latch means for releasably interlocking the drawbar sections in alignment.

15. The trailer hitch as claimed by claim 10 wherein the secondary pivot axis is vertical and defined by an elongated upright pin joining the drawbar means and bracket means, permitting pivotal motion of the drawbar means about the secondary axis and preventing relative rolling pivotal motion of the bracket means and drawbar means about a longitudinal horizontal axis.

* * * * *